J. R. JAMESON.
HAT PIN ATTACHMENT.
APPLICATION FILED FEB. 13, 1909.
958,404.
Patented May 17, 1910
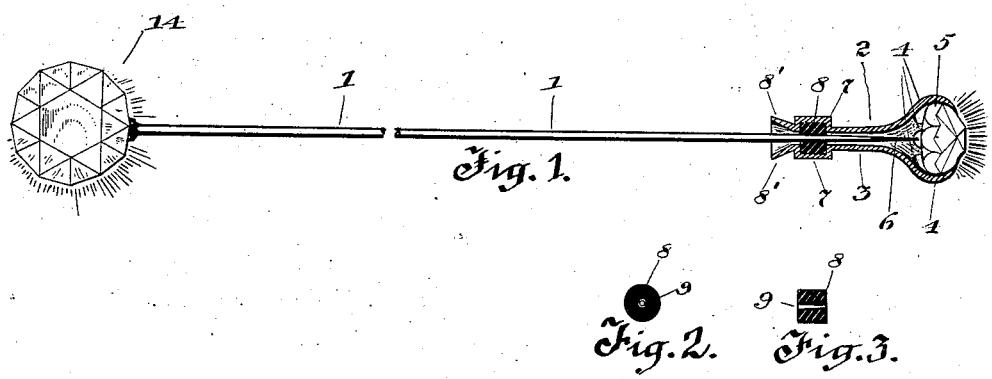

UNITED STATES PATENT OFFICE.

JOHN R. JAMESON, OF OAK PARK, ILLINOIS.

HAT-PIN ATTACHMENT.

958,404. Specification of Letters Patent. Patented May 17, 1910.

Application filed February 13, 1909. Serial No. 477,564.

*To all whom it may concern:*

Be it known that I, JOHN R. JAMESON, a citizen of the United States, residing at Oak Park, county of Cook, and State of Illinois, have invented a certain new and useful Hat-Pin Attachment, of which the following is a specification.

My invention relates to an attachment for hat pins, the object being to provide a simple and inexpensive device of this character designed to protect people from accidental injury by coming in contact with the point of a hat pin, and which shall be ornamental as well as convenient for the wearer.

A further object of my invention is to provide a hat pin device which will not only protect people from injury but which will be adapted to hold the hat pin in position in the hat and thus prevent the loss of it. And a further object is to provide a conical or flaring end to the attachment in order to facilitate engagement with the hat pin point.

Other objects will appear hereinafter.

With these objects in view my invention consists in such a novel construction and arrangement of parts all as will be hereinafter fully described and particularly pointed out in the appended claim.

My invention will be more readily understood by reference to the accompanying drawings forming a part of this specification, and in which, Figure 1 is a longitudinal section of my invention in its preferred form, Figs. 2 and 3 are respectively end and sectional views of a rubber bushing used in the attachment.

Referring now to the drawings 1 indicates a hat pin and 2 the hat pin attachment in position thereon. The attachment 1 comprises a preferably tubular sleeve portion 3 expanded and formed into claws 4 at the outer end thereof forming a setting for a jewel 5, which serves as a stop for the hat pin 6. Secured in an enlarged tubular portion 7 integral with the sleeve portion 3 is a bushing 8 of soft rubber or other yieldable material having a central axial perforation or bore 9. This bore is preferably tapering, the larger end of which is at the inner end thereof so that the point 6 may be centrally guided. The diameter of the bore 9 is smaller than that of the cylindrical portion of the hat pin 1 before the attachment 2 is placed in position; consequently the bushing 8 grips the hat pin 1 when the attachment is in position and securely holds the same thereon. The inner end 8' is integral with the portion 7 and is flaring or conical in form, thus serving as a means for readily finding the point 6 of the hat pin 1.

The ends of the enlarged portion 7 serve to prevent removal of the bushing while its outer walls reinforce the bushing for tight gripping. By providing a tapering bore in the bushing tearing of the rubber is prevented while insuring a tight hold on the pin.

While I have shown what I deem to be the preferable form of my invention, I do not wish to be limited thereto, as there might be still further modifications of the same which would be comprehended within the scope of the appended claim.

Having described my invention what I claim as new and desire to secure by Letters Patent is:

In a device of the class described, the combination with a hat pin, of a tubular sleeve portion expanded and formed into claws at one end, a jewel secured in said claws behind said tubular sleeve and adapted to serve as a stop for a pin therein, an enlarged tubular portion on the sleeve portion, a rubber bushing having a central tapering bore and secured in said enlarged tubular portion, and a flaring end portion adjacent the said enlarged tubular portion; substantially as described.

In testimony whereof I have signed my name to this specification in the presence of two subscribing witnesses.

JOHN R. JAMESON.

Witnesses:
JOSHUA R. H. POTTS,
HELEN F. LILLIS.